United States Patent

[11] 3,628,511

[72] Inventor Hans Fischer
    Nurnberg, Germany
[21] Appl. No. 711
[22] Filed Jan. 5, 1970
[45] Patented Dec. 21, 1971
[73] Assignee Maschinenfabrik Augsburg-Nurnberg
    Aktiengesellschaft
    Nurnberg, Germany
[32] Priority Feb. 1, 1969
[33] Germany
[31] P 19 05 029.4

[54] PISTON FOR INTERNAL COMBUSTION ENGINE WITH DIRECT FUEL INJECTION
5 Claims, 3 Drawing Figs.

[52] U.S. Cl. .................................................. 123/41.35,
    123/41.16, 92/176, 92/186, 92/231
[51] Int. Cl. ................................................... F01p 1/04,
    F01b 31/08
[50] Field of Search ...................................... 123/41.35,
    41.16; 92/176, 186, 237, 231

[56] References Cited
UNITED STATES PATENTS

| | | | |
|---|---|---|---|
| 1,953,109 | 4/1934 | Heron | 123/41.16 |
| 2,066,613 | 1/1937 | Day | 92/237 |
| 2,108,865 | 2/1938 | Long | 92/237 |
| 2,315,403 | 3/1943 | Dillon | 92/231 X |
| 3,012,831 | 12/1961 | Cheney et al. | 92/231 X |
| 3,035,559 | 5/1962 | Brandes et al. | 123/32.4 |
| 3,413,897 | 12/1968 | Atkin | 92/260 |

FOREIGN PATENTS

| | | | |
|---|---|---|---|
| 288,136 | 9/1928 | Great Britain | 123/41.16 |

*Primary Examiner*—Laurence M. Goodridge
*Assistant Examiner*—Cort Flint
*Attorneys*—Francis D. Stephens and Hugo Heuttig, Jr.

ABSTRACT: A piston of the type including a pistonhead having a combustion chamber in its upper face and piston ring receiving grooves about its periphery. The pistonhead is machined with a concentric element on its underside adapted to engage a concentric element on a wrist pin bearing frame on which partial skirts or slipper elements are mounted to distribute the transverse thrust of the piston against the cylinder wall. The combustion chamber is surrounded by a shell element through which the on concentric element extends and to which it is sealed, preferably by welding. The upper portion of the shell extends upwardly spaced from the wall of the combustion chamber to provide a cooling space to receive a meltable first coolant, and a second annular shell element, or border member, may be mounted between the inner wall of the ring supporting periphery of the pistonhead below the piston ring grooves and the outer wall of the shell element, to form a chamber for a second coolant which may be the engine lubricant.

INVENTOR
Hans Fischer

INVENTOR

Hans Fischer

PISTON FOR INTERNAL COMBUSTION ENGINE WITH DIRECT FUEL INJECTION

The invention relates to a piston for an internal combustion engine with direct fuel injection having a combustion chamber insert which is, in its form, adapted to the desired method of combustion and which is set in place in the skirt of the piston and is rigidly connected with it. It is further provided with a shell which is slid over the combustion chamber insert and is sealed tight to it by welding. This shell forms an inner cooling chamber between it and the combustion chamber wall for the control of the temperature of the combustion chamber wall and it also may provide an outer cooling chamber for the portion of the piston which receives the piston rings, as well as for the indirect cooling of the cooling agent which is present in the inner cooling chamber, which cooling agent becomes liquid during partial load and also under full load operation of the engine.

Pistons which have two different cooling systems which are completely separate from one another and in which, in general, also different types of cooling agents are used, have already become known and are old in the art. Such a cooling system which uses two different cooling media has the advantage that the dissipation of the heat from selected portions of the piston can be accomplished on a controlled basis. It is possible, then, to cool down points of the piston, such as for instance the wall of the combustion chamber, which are subjected to intense heat to a much lower temperature range, and also to remove heat from other parts of the piston which are not subjected to such intense heat, but which nevertheless require a certain cooling, by only a small fraction of the temperature drop required at the combustion chamber.

Pistons which have two different cooling systems in which the removal of the heat from certain spots or points of the piston are known, as seen in U.S. Pat. application Ser. No. 744,071, and in this particular case, the wall of the combustion chamber is adapted also to the operational conditions which prevail at any given time. These conditions change in response, for instance, to the suction temperature of the combustion air as well as in response to the load condition of the engine. In this type of construction, a tightly sealed and closed inner cooling chamber is arranged around the wall of the combustion chamber and the portion of the piston which receives the piston rings is provided with an outer cooling chamber. The oil of the engine may be used as the cooling agent for the outer cooling chamber and is circulated through the system so that it cools the piston rings and the corresponding part of the piston in a uniform manner.

The inner cooling chamber is partially filled with a heat conducting, metallic, organic or mineral material or with a certain wax with a predetermined melting point. When its temperature falls below this melting point, this cooling agent assumes a solidified and rigid condition on the bottom of the cooling chamber, so that it forms only a small surface for the transfer of heat between the wall of the combustion chamber and the cover or shell which is cooled with oil, while the remaining part of the inner cooling chamber, which is filled with air, represents a heat insulating part. If and when the wall of the combustion chamber is heated up to such a point that the cooling agent has reached its melting point, then the coolant is "shaken" up and down in its liquid condition by the upward and downwardly moving piston and it contacts the entire outer surface of the combustion chamber and surface of the cover or shell, which then provides a satisfactory cooling of the wall of the combustion chamber. It is in this manner that the wall of the combustion chamber is insulated during the starting of the engine, when the engine is idling, and also when it is in the lower range of partial load, at a point when its required theoretical temperature has not as yet been reached. The combustion chamber is, then, insulated to a substantial degree and over most of its surface under starting and light load conditions so that it is only cooled after the most favorable temperature of the combustion chamber has been reached.

The above-described piston, which is produced either by casting it or by a pressing process, is provided with a combustion chamber insert which is inserted in the skirt of the piston and consists of heat-resistant steel. The inner cooling chamber is, in this particular instance, formed by a hollow shell forming a chamber surrounding the combustion chamber.

The outer cooling chamber, in a further development of such a piston with the above-described cooling system, may be constructed in such a manner that it extends at least partially around the inner cooling chamber and that it is used, during partial and also full load operation of the engine, where a large dissipation or removal of the heat from the wall of the combustion chamber is absolutely necessary, for the indirect cooling of the inner cooling agent. In order to bring the strength of the wall between the two cooling chambers down to a minimum and further for the purpose of a very much simplified construction, this intermediate wall is formed by a casing or shell which is slid over the insert of the combustion chamber and sealed tight to it by means of welding.

Pistons of internal combustion engines which have a cooling system which uses two different media have proven to be quire satisfactory when in operation. However, when properly evaluated it becomes obvious that there is a disadvantage in the construction up to the present time in that the entire apparatus becomes too heavy for high-speed engines. Furthermore, the section carrying the piston rings, especially when the piston is cast of a light metal and because of the relatively thick walls, which result in an excellent ability to conduct heat, is nevertheless heated up to a relatively high temperature, and further because of the large volume of the skirt of the piston, it has been shown that a portion of the heat that should be dissipated to the cooling agent is stored or is imparted to the wall of the cylinder. Because of this storage of the heat, it may occur during higher thermal load of the piston that the piston rings become stuck or that a tear or other kind of damage to the piston skirt may develop.

As far as the reduction of the weight is concerned, pistons are known which, in different types of construction, have been screwed together or even welded together from several individual parts. In the past, pistons have been proposed in which, with regard to the transfer of heat to the wall of the cylinder, and/or the storage of such heat, the pistonhead is provided with only a narrow piston ring support which is used as the surface of the casing or cooling jacket and in which the piston is guided by separate slide pieces or slippers mounted below the pistonhead.

It is, therefore, the object of this present invention to produce a lightweight piston of the above-described type, having a combustion chamber that is adapted to the respective method of combustion and also with two cooling systems, which are independent of one another, and in which piston the above-mentioned disadvantages are avoided, whereby high thermal dissipation and a satisfactory transfer or exchange of heat to the cooling agent is provided.

According to the invention, this problem is solved in that the combustion chamber insert is solidly connected with a ring support by welding in the well-known manner, and further that the upper portion of the piston, which consists of the insert, the combustion chamber, the ring support, and the casing or shell, with a lower portion of the piston which carries the rigidly placed "sliding shoes" or "slippers" and which receive the wrist pin, can be fitted together precisely axially and radially with respect to each other by means of a centering means and then rigidly connected by welding.

The centering means consists in the above case of a centering collar or protrusion which is provided on the bottom of the insert of the combustion chamber and which is limited with regard to its height, and a centering hub or collar which is arranged on the lower portion of the piston onto or into which the centering attachment fits snugly, depending on which element carries the female and which the male element.

A simple type of construction of said lower portion of the piston is achieved by forming it in a U-shaped so it forms a bridge or bracket which is provided with legs which have bores for the reception of the wrist pin bearings. The guide shoes or slippers, which are also provided, are arranged in each instance at each longitudinal side of the wrist pin and lie opposite one another and are attached to the bridge, preferably by means of expanding screws to form the lower portion of the piston.

It is still further proposed in another development of the present invention to provide a closed outer cooling chamber, which is closed off by means of a restricting boundary member which is provided, in turn, with corresponding openings or oil catch nozzles for the entrance and discharge of the cooling agent for use with engines having large piston diameters or with engines which are subjected to a high load, for the purpose of increasing the cooling of the outer portions of the system.

As far as the combustion chamber is concerned which is formed by the insert in the pistonhead, it is entirely possible that it, as already mentioned above, can be provided with any chosen form depending upon the method of combustion and it can be arranged also eccentrically of the longitudinal axis of the piston.

Particular details of the invention become obvious from the following description of an example of construction as shown in the attached drawings in which.

Figure 1:
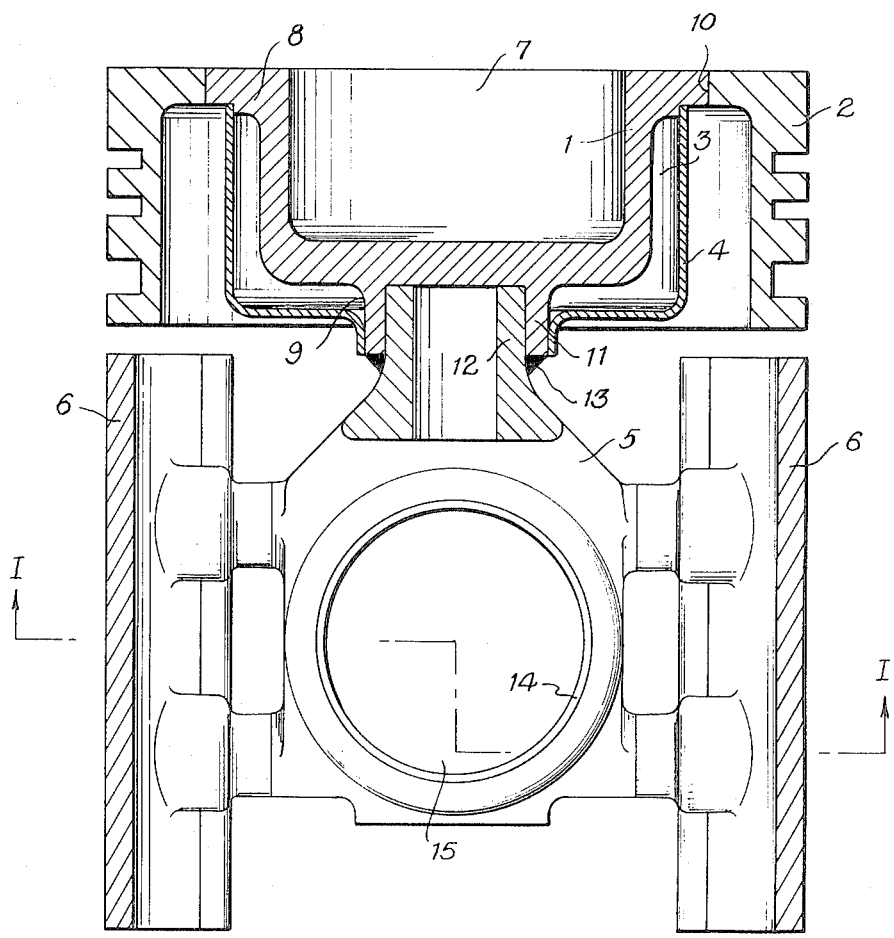
FIG. 1 is a longitudinal section through a piston of the present invention.

Seen in FIG. 1, the insert 1 of the combustion chamber is secured in the piston ring support 2, and the casing or shell 4, which closes or seals the inner cooling chamber 3 is secured to insert 1, the lower part 5 of the piston and the guide or slide shoes 6 being attached coaxially to the insert 1.

As can be seen from FIG. 1, the insert 1 forming the combustion chamber is provided on its surface which is turned away from the combustion chamber 7 with an upper shouldered flange 8 and a lower collar 9, with which the casing 4, which is slid over its, is tightly connected by welding to make a tight seam. A welding seam 10 is provided in this particular instance, in the top face of the piston to connect the insert 1 of the combustion chamber with the piston ring support or short piston skirt 2.

On the insert 1 of the combustion chamber, a protruding boss or centering attachment 11, which is of limited height, is provided to engage a centering hub or boss 12 located on the lower portion 5 of the piston. The upper portion of the piston, which consists of the insert 1 of the combustion chamber, the piston ring support 2, and the casing or shell 4, is fixed by the centering members or bosses 11 and 12 in its axial direction as well as in its radial direction with respect to the lower portion 5 of the piston and it is secured by a welding seam 13 in such a manner that it is absolutely solid and tight. FIG. 1 shows how the surface 9 is provided on the outer side of the centering protrusion 11; however, it can also be constructed as a separate collar. The U-shaped lower portion or frame 5 of the piston, which may be produced by means of an originally flat member bent into a U, is provided with bores 15 which carry bearing boxes 14 to receive the wrist pin of the piston, which is not shown in the drawing. The guides or slippers 6 are attached to the arms of U-shaped frame 5 of the piston and lie opposite each other on the two sides parallel to the bores 15.

Figure 2:
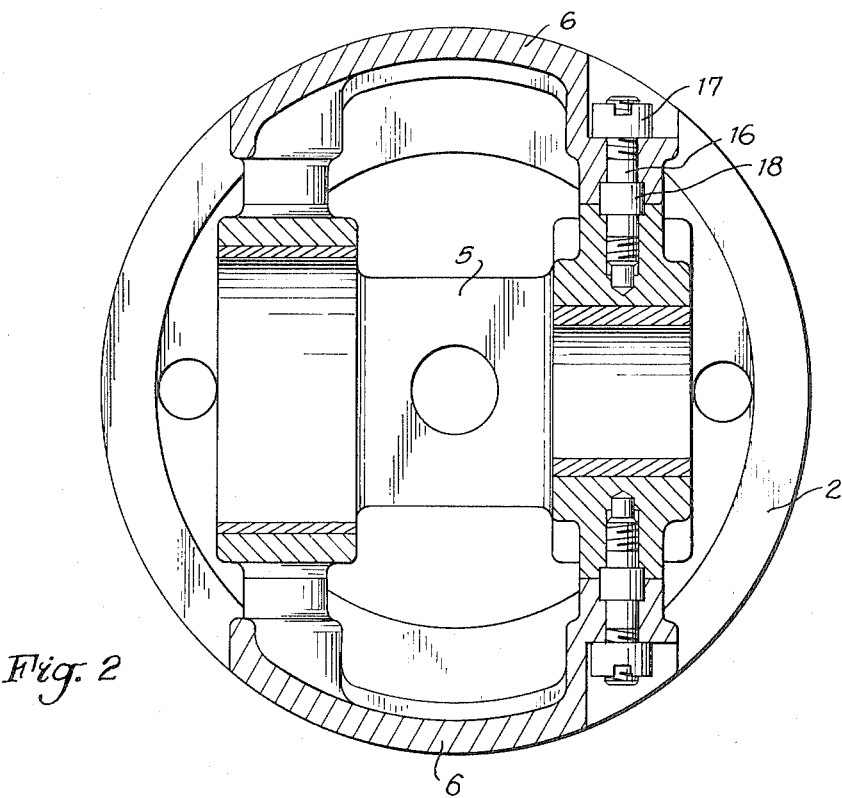
FIG. 2 is a section or line I—I through the piston of FIG. 1.

In FIG. 2, the guide shoes or slippers 6 are shown as being attached by means of expansion pin screws 16 and nuts 17 on the lower part 5 of the piston. At the points where the slippers 6 are connected to the lower part 5 of the piston, centering members 18 are provided on the expansion pin screws 16 for the purpose of a satisfactory installation of the slippers 6.

Figure 3:
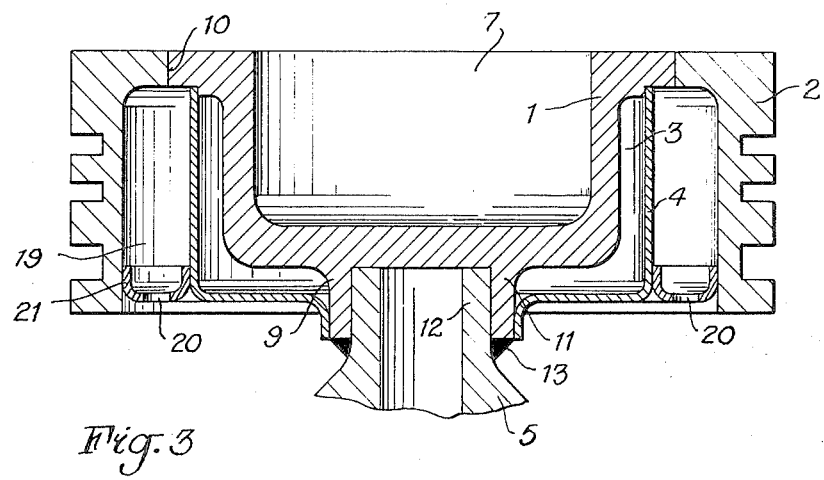
FIG. 3 shows the upper portion of a piston according to FIG. 1 in which an outer closed cooling chamber is provided.

FIG. 3 shows a further development of the piston according to FIG. 1. In this instance, an outer enclosed cooling chamber 19 is provided which is formed by means of a restricting border member 21, which is tightly welded to the inner wall of the ring support 2 and to the outer wall of the shell 4 and which is provided with openings 20 for the entrance and discharge of the cooling agent. This type of construction is provided, as already mentioned above, mainly for pistons that have large diameters or for the pistons of engines that have to carry a heavy load, that is, in cases when the heat that is removed by the sprayed oil no longer provides or brings about a satisfactory cooling.

It will be understood that a suitable cooling medium, not shown, is sealed within the cooling chamber 3.

Having now described the means by which the objects of this invention are obtained,

I claim:

1. A piston for direct injection internal combustion engines having a pistonhead portion and having a wrist pin yoke and slipper means forming a lower piston section, said pistonhead portion comprising a hollow cylindrical element provided with piston ring grooves forming a short piston skirt, a combustion chamber insert formed with a peripheral flange welded to the said hollow cylindrical element to close the top of said piston, said combustion chamber insert being also provided at a point remote from said peripheral flange with cylindrical boss having its axis concentric with said short piston skirt and a casing sealed at the top to said peripheral flange of said combustion chamber and sealed at the bottom to said hollow cylindrical boss, said casing being spaced from the wall of said combustion chamber to form a space to receive a cooling medium, and a space between said casing and said short piston skirt, said lower piston section comprising a yoke element carrying wrist pin bushings and having a boss thereon complementary to said cylindrical boss on said combustion chamber insert and welded thereto to hold said lower piston section and said pistonhead portion in axial alignment, said slipper means being secured to said yoke to support the lateral thrust of said piston against the cylinder walls of an engine when in use.

2. The piston of claim 1 having a restricting border member extending from the lower edge of said short piston skirt to said shell to define the space between said short piston skirt and said shell as an outer cooling chamber, said restricting border element being provided with passages therethrough to provide for entrance and discharge of a coolant.

3. The piston of claim 1 in which said yoke is of U shape, the wrist pin bushings being located in the arms of the U.

4. The piston of claim 3 in which each of said slippers is rigidly secured to both arms of said U by expansion pin screws provided with a centering member to assure accurate positioning of said slippers on the arms of said yoke.

5. The piston of claim 1 in which the centering boss on said combustion chamber is a collar and the centering boss on said lower portion is of a size to be telescopically received in said collar.

* * * * *